United States Patent [19]

Kubo et al.

[11] Patent Number: 4,472,125
[45] Date of Patent: Sep. 18, 1984

[54] TIRE LOADING APPARATUS FOR A TIRE VULCANIZING MACHINE

[75] Inventors: Masayoshi Kubo; Akira Hasegawa; Katsuyoshi Sakaguchi, all of Nagasaki, Japan

[73] Assignee: Mitsubishi Jukogyo Kabushiki Kaisha, Japan

[21] Appl. No.: 411,336

[22] Filed: Aug. 25, 1982

[30] Foreign Application Priority Data

Sep. 1, 1981 [JP] Japan ................................ 56-137523

[51] Int. Cl.³ .............................................. B29H 5/02
[52] U.S. Cl. ........................................ 425/38; 211/23; 294/93; 414/225; 414/429; 425/58
[58] Field of Search ...................... 425/38, 58; 294/93; 414/225, 226, 428, 429; 211/23, 24

[56] References Cited

U.S. PATENT DOCUMENTS 4,252,241 2/1981 Trail ................................. 425/38 X

FOREIGN PATENT DOCUMENTS 46-24773 7/1971 Japan ..................................... 425/38
50-31911 10/1975 Japan ..................................... 425/38

*Primary Examiner*—Jan H. Silbaugh
*Attorney, Agent, or Firm*—McGlew and Tuttle

[57] ABSTRACT

An improved tire loading apparatus for a tire vulcanizing machine is disclosed which includes a plurality of tire clamping shoes arranged radially relative to the center thereof, the tire clamping shoes being adapted to move outwardly or inwardly in the radial direction, wherein an annular centering ring is provided for restricting radial movement of the tire clamping shoes.

12 Claims, 4 Drawing Figures

TIRE LOADING APPARATUS FOR A TIRE VULCANIZING MACHINE

FIELD AND BACKGROUND OF THE INVENTION

The present invention relates to a tire loading apparatus for a tire vulcanizing machine.

Hitherto a variety of tire loading apparatuses were proposed for charging a green tire into a molding die assembly on a tire vulcanizing machine. One of the conventional tire loading apparatuses is constructed in such a manner as to include a plurality of tire clamping shoes arranged radially relative to the center thereof, said tire clamping shoes being adapted to move outwardly or inwardly in the radial direction.

A drawback which is inherent to the conventional tire loading apparatus is, however, that it has a substantially reduced centering accuracy because a green tire to be vulcanized is manually charged onto a tire holding stand of the apparatus the loading operation and in case of a light weight type tire the upper side wall of the tire is deformed unsymmetrically relative to the lower one due to a reduced rigidity of the side wall when the green tire is firmly held in a horizontal posture along the tread portion thereof. Further, another drawback of the conventional loading apparatus is that there is a danger that a green tire will become deformed into a polygonal configuration due to an outwardly activated stretching force which is required for holding the green tire securely. One of the possible remedial measures for preventing unsymmetrical deformation of the upper side wall of the green tire is to increase the width of the tire clamping shoes. This proposal however, is impracticable because there is a certain restriction relative to radial displacement of the tire clamping shoes. In addition to this, another drawback of the conventional loading apparatus is that delicate adjustment is required for reduction of the stretching force given by the tire clamping shoes followed by downward displacement of the green tire in order to ensure that horizontal straightening is effected for the unsymmetrically deformed upper side wall of the green tire. Further, it is found that correct centering is not easy to achieve due to appreciable clearance in guide members for the tire clamping shoes and that no correct centering is ensured when the green tire is firmly held along the inner wall of the bead portion thereof with the tire clamping shoes radially displaced to the outermost position, resulting in elliptical deformation of the bead portion. Obviously, these drawbacks which are inherent to the conventional loading apparatus have an adverse effect on the quality of the tires which are manufactured in the vulcanizing machine.

SUMMARY OF THE INVENTION

Thus, the present invention is intended to obviate the above-described drawbacks relative to the conventional tire loading apparatuses. Accordingly, it is an object of the present invention to provide an improved tire loading apparatus for a tire vulcanizing machine which ensures that loading the operation is carried out with a correct centering maintained for a green tire to be vulcanized.

To accomplish the above object of the present invention there is proposed in accordance with the present invention an improved tire loading apparatus for a tire vulcanizing machine of the kind which includes a plurality of tire clamping shoes arranged radially relative to the center thereof, said tire clammping shoes being adapted to move outwardly or inwardly in the radial direction, wherein an annular centering ring is provided for restricting radial movement of the tire clamping shoes. The annular centering ring makes it possible to restrict radial movement of the tire clamping shoes and then to firmly hold a green tire with the tire clamping shoes located at a correct centering position. In this way an increased loading accuracy is ensured for a green tire to be vulcanized by means of the tire loading apparatus. The apparatus is also simple in structure, and results in the production of a tire having an improved quality in the vulcanizing machine.

Other objects and advantageous features of the present invention will be apparent from the following description made in connection with the accompanying drawings.

DESCRIPTION OF THE PREFERRED EMBODIMENTS

The present invention will now be described in greater detail with reference to the accompanying drawings which illustrate preferred embodiments of the present invention.

Figure 1:
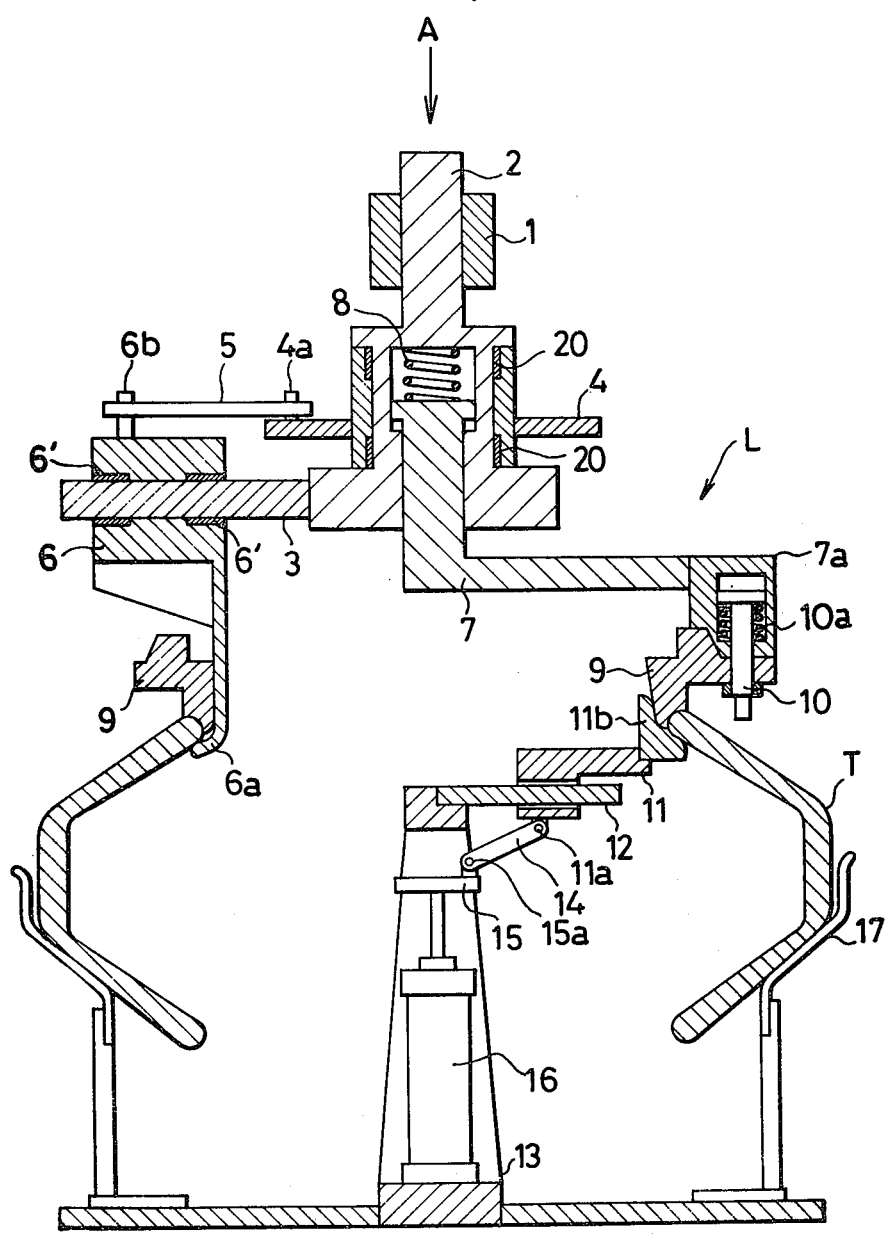
FIG. 1 is a vertical sectional view of a tire loading apparatus for a vulcanizing machine in accordance with an embodiment of the present invention.
Figure 2:
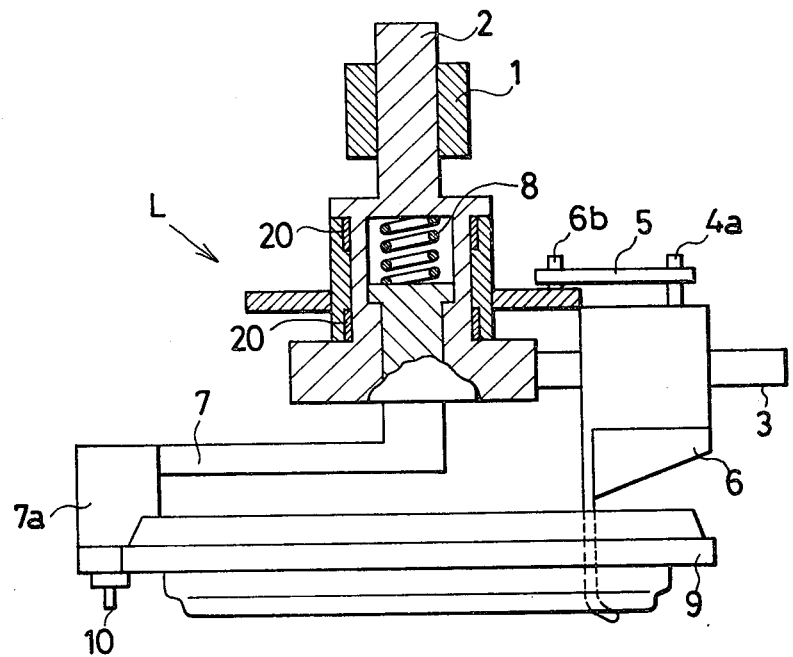
FIG. 2 is a vertical sectional view of the tire loading apparatus in FIG. 1 prior to holding a green tire.
Figure 2:
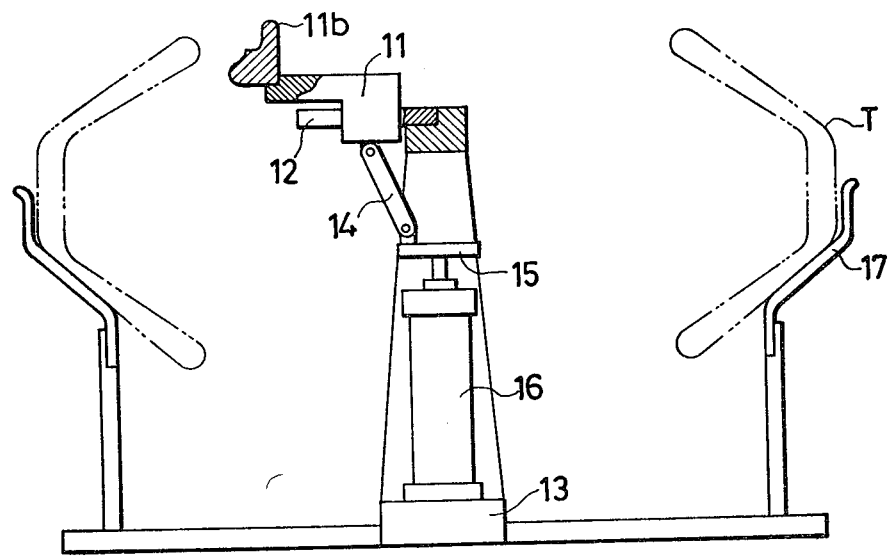
Figure 3:
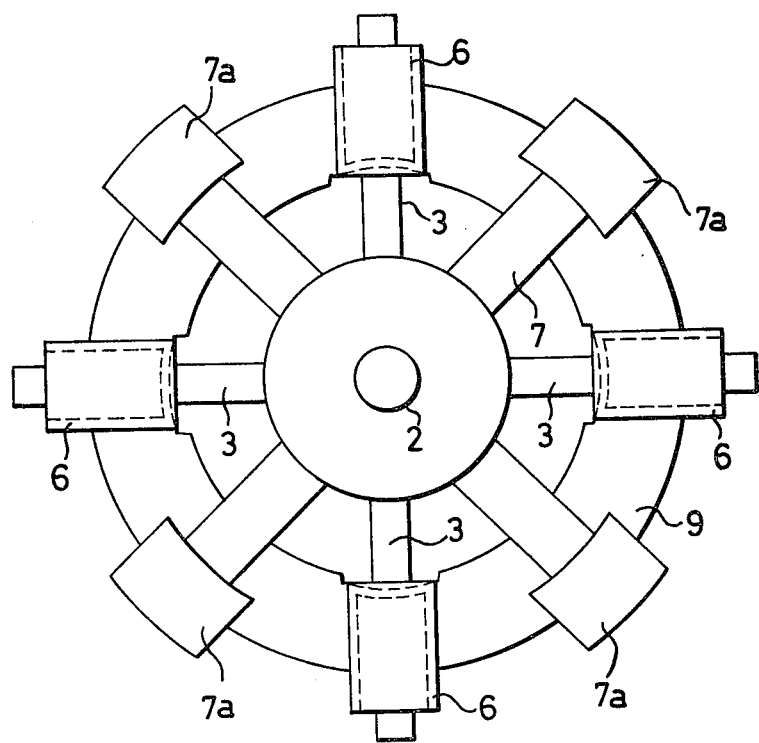
FIG. 3 is a plan view of the tire loading apparatus as seen from above in the direction of arrow A in FIG. 1.

First, referring to FIGS. 1 to 3, reference numeral 1 designates a frame by means of which a loading apparatus as generally designated L, is raised and then transferred to a vulcanizing machine (not shown). A support 2 for the loading apparatus L is fixedly secured to the frame 1, and a plurality of shoe guides 3 are fixedly secured to the lower end part of the support 2, said shoe guides 3 extending from support 2 in the radial direction. A plurality of tire clamping shoes 6 with bushings 6' fitted therein, are adapted to slide on said shoe guides 3 in the radial direction and include a lower extension with a lower end $6_a$ which is bent outward and a pin $6_b$ projecting upwardly. Reference numeral 4 designates a ring with bushings 20 fitted therein, said ring 4 being rotated about the support 2 with the aid of a hydraulic cylinder (not shown). Reference numeral 5 designates a link by way of which a pin $4_a$ on the ring 4 is operatively connected to the pin $6_b$ on the tire clamping shoe 6, said link 5 being intended to allow the respective tire clamping shoes 6 to slide on the shoe guides 3 outwardly or inwardly in the radial direction at the same time by rotating the ring 4.

Reference numeral 7 designates a radially extending holding member having a central portion vertically displaceably fitted into the cavity in the support 2 and which is normally depressed downwardly by means of a coil spring 8. Said holding member 7 includes a bracket $7_a$ firmly fixed to the outer end thereof and an annular centering ring 9 which is detachably fitted to the lower end part of the respective brackets 7$_a$ with the aid of a combination of a pin 10 and a coil spring 10$_a$.

Said centering ring 9 serves to restrict the outward movement of the respective tire clamping shoes 6 and thereby ensure that a true circle is formed by them. Further, the centering ring 9 is brought into contact with a part of the upper bead portion of a green tire and an L-shaped bead holder 11$_b$ mounted on a green tire holding stand which will be described later.

Reference numeral 13 designates a green tire holding stand essentially comprising a ring 17 for holding a green tire T along the outer periphery thereof, a hydraulic cylinder 16 fixedly mounted on the central part of the holding stand 13, a radially extending guide 12 fixedly secured to the upper end part of the holding stand 13, a bracket 11 adapted to slide on said guide 12 in the radial direction, the L-shaped bead holder 11$_b$ fixedly secured to the outer end part of said bracket 11, a pin 11$_a$ by way of which the bracket 11 is operatively connected to a rod end 15 of the hydraulic cylinder 16, a link 14 and a pin 15$_a$.

Next, operation of the loading apparatus constructed in the above-described manner will be described below.

As shown by phantom lines in FIG. 2, a green tire T is first placed on the ring 17 mounted on the green tire holding stand 13 and then the hydraulic cylinder 16 is actuated to extend the rod 15 in the upward direction so that the bead holder 11$_b$ is displaced outwardly in the radial direction. As a result the bead portion of the green tire T is firmly held from the inside by means of the plural bead holders 11$_b$ as shown in FIG. 1. It should be noted that the working stroke of the respective bead holders 11$_b$ is restricted with the aid of limit switches or mechanical stoppers both of which are not shown in the drawing.

When the frame 1 is lowered, the centering ring 9 is first brought in contact with the bead holder 11$_b$. When the frame 1 is lowered further by a short distance, the coil spring 8 is compressed while the lower end 6$_a$ of the downward extension from the tire clamping shoes 6 is lowered to the lower side of the bead of the green tire T. Thus, a proper position is detected for the tire clamping shoes 6 by means of microswitches or the like which are not shown in the drawing and then their lowering comes to a stop.

Next, as the ring 4 is rotated and the tire clamping shoes 6 are displaced outwardly in the radial direction, their lower end 6$_a$ abuts against the lower side of the tire bead. At this moment the respective tire clamping shoes 6 are brought in contact with the inner peripheral wall of the centering ring 9 and their further displacement is restricted so that an intended correct centering is ensured. Next, when the frame 1 is raised with the lower end 6$_a$ of the tire clamping shoes 6 brought into abutment against the lower side of the tire bead, the centering ring 9 becomes effective in depressing the bead portion of the green tire T with resilient force of the coil spring 8, while the green tire T is horizontally clamped between the centering ring 9 and the lower end 6$_a$ of the tire clamping shoes 6 with correct centering maintained for the tire T.

While the tire T is firmly held in the abovedescribed manner with correct centering maintained, the frame 1 is raised further, transferred to the vulcanizing machine and then lowered onto a molding die assembly (not shown). Thus, the tire T is placed on the molding cavity in the die assembly on the vulcanizing machine by displacing the tire clamping shoes 6 inwardly in the radial direction.

As will be readily understood from the above description with respect to the illustrated embodiment of the present invention it is ensured that a green tire is firmly held with correct centering maintained with the aid of the tire clamping shoes in the loading apparatus at every cycle of the tire loading operation. Thus, it can be concluded that the loading apparatus in accordance with the present invention is suitable particularly for loading a green tire which is in use for manufacturing modern radial tires which are light in weight but tend to be easily deformed. Further, an substantially improved quality of tires manufactured in the vulcanizing machine can be expected by employing the loading apparatus of the present invention.

Lately, it has been said that the quality of a tire, particularly the above type of radial tire manufactured in a vulcanizing machine, is determined by more than 70% by the loading accuracy provided by the tire loading apparatus. Further, due to the latest requirement for substantially increased rigidity for ensuring an improved accuracy of the loading apparatus, employment of specially designed bearings are employed for sliding portions in the loading apparatus and elsewhere. There is thus a tendency to make the loading apparatus increasingly complicated, resulting in an increased manufacturing cost. However, the loading apparatus in accordance with the present invention makes it possible to obviate the drawbacks inherent to the conventional ones merely by way of their partial modification and ensures an increased accuracy of the loading operation.

Figure 4:
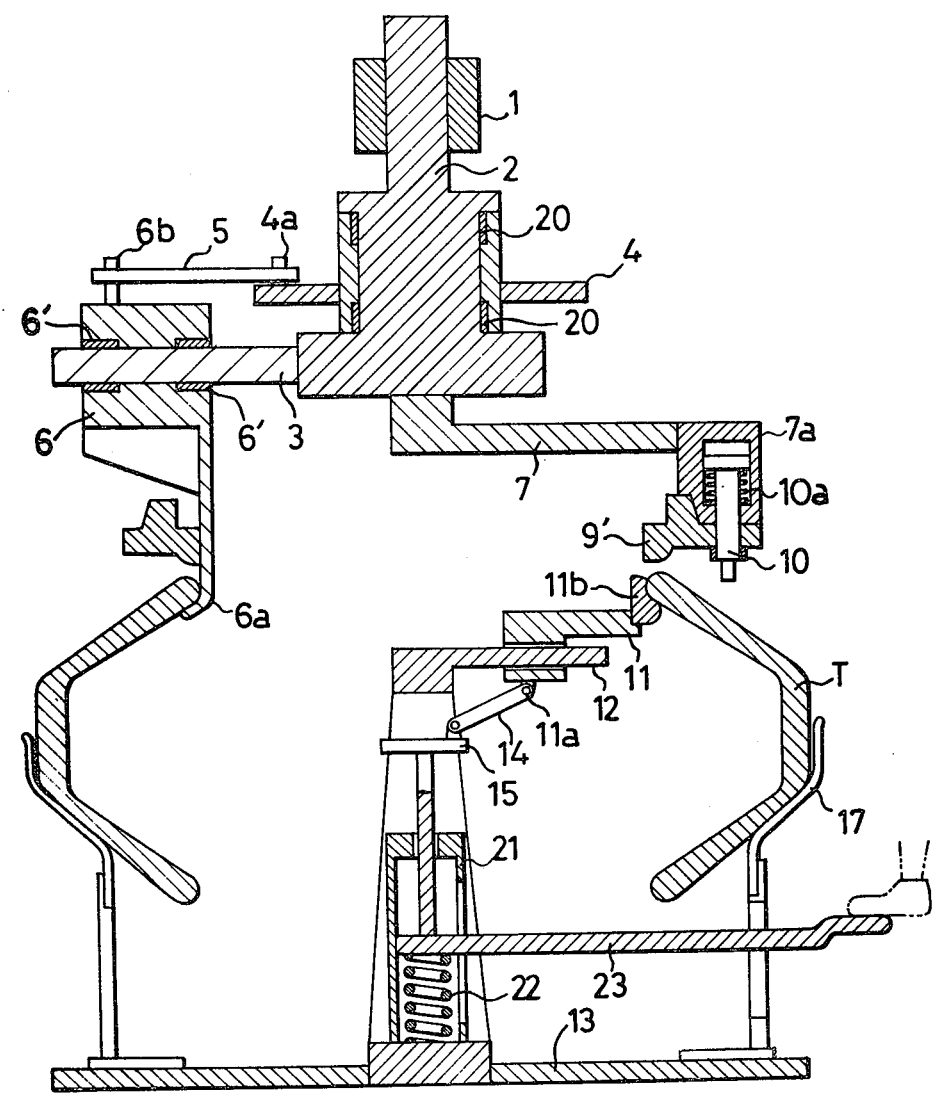
FIG. 4 is a vertical sectional view of a tire loading apparatus in accordance with another embodiment of the present invention.

As described above with respect to the embodiment illustrated in FIGS. 1 to 3, an arrangement is made such that the holding member 7 is vertically displaceably fitted into the cavity of the support 2 with the coil spring 8 incorporated therein, the centering ring 9 comes into contact with the bead holders 11$_b$ and the bead portion of the green tire T and radial displacement of the bead holders 11$_b$ is initiated by the hydraulic cylinder 16. Alternatively, the present invention may be practiced in a modified embodiment as illustrated in FIG. 4. Specifically, in the modified embodiment the loading apparatus is constructed such that the holding member 7 is fixed directly to the support 2 and the centering ring 9' serves merely for restricting radial displacement of the respective tire clamping shoes 6. Further, no hydraulic cylinder is employed in the modified embodiment and thus a mechanism for displacing the bead holders 11$_b$ in the radial direction is constituted by a combination of a stationary guide 21 for guiding the rod 15, a foot pedal 23 fixedly secured to the lower end of the rod 15 and a coil spring 22 adapted to normally urge the rod 15 in the upward direction so that the bead holders 11$_b$ are radially displaced by depressing the foot pedal 23. Also in the modified embodiment it is ensured that a green tire is firmly held with correct centering maintained with the aid of the plural tire clamping shoes in substantially the same manner as in the foregoing embodiment. It should be of cource understood that resilient force of the coil spring 22 is designed in such a manner that the bead holders 11$_b$ do not cause excessive expansion of the bead portion of the green tire.

We claim:

1. A tire loading apparatus for loading a green tire having at least one annular bead, into a tire vulcanizing machine comprising:

a support for supporting a green tire by its annular bead;

a plurality of clamping shoes each having an end for engaging the annular bead of a green tire, each clamping shoe movably mounted to said support for radial inward and radial outward movement with respect to a center of an annular bead of a green tire to be moved;

clamping shoe drive means connected between said support and said plurality of clamping shoes for moving said clamping shoes radially inwardly and radially outwardly; and an annular centering ring connected to said support and disposed around said plurality of tire clamping shoes, said annular centering ring centered on the center of the annular bead of a green tire to be moved, said drive means operable to move said plurality of clamping shoes radially outwardly until each clamping shoe engages against said annular centering ring to restrict further radially outward movement of each clamping shoe.

2. A tire loading apparatus according to claim 1, wherein said annular centering ring includes a bead engagement portion shaped to engage an upper bead of a green tire to be moved, each end of said plurality of clamping shoes being shaped to engage the upper bead of a green tire to be moved with the bead of the green tire being held between said annular centering ring and each end of said clamping shoes.

3. A tire loading apparatus according to claim 2, wherein said annular centering ring is mounted for vertical movement with respect to said support for permitting relative vertical movement between said annular centering ring and said end of each of said plurality of clamping shoes, and biasing means engaged between said support and said annular centering ring for biasing said annular centering ring downwardly, said engagement portion of said annular centering ring adapted to engage an upper part of the upper bead of a green tire to be moved and each end of said plurality of clamping shoes being shaped to engage a lower portion of an upper bead of a green tire to be moved.

4. A tire loading apparatus according to claim 3, including a green tire holding stand having a holding ring for supporting a green tire with a center of a green tire held by said holding ring being adjacent a central axis of said annular centering ring of said support, and centering means connected to said holding stand for centering a green tire held by said holding ring with respect to the central axis of said annular centering ring.

5. A tire loading apparatus according to claim 4, wherein said centering means comprises a plurality of bead holders movably mounted to said holding stand for radial movement, each bead holder having a green tire bead engaging portion for engaging an upper bead of a green tire held by said holding ring in such a way so that said annular centering ring can also engage the upper bead of the green tire held in said holding ring.

6. A tire loading apparatus according to claim 5, wherein said centering ring and said plurality of bead holders are shaped to engage each other with said centering ring and said bead holders also engaged with the upper bead of a green tire supported by said holding ring.

7. A tire loading apparatus according to claim 1, including a green tire holding stand having a holding ring for supporting a green tire with a center of a green tire held by said holding ring being adjacent a central axis of said annular centering ring of said support, and centering means connected to said holding stand for centering a green tire held by said holding ring with respect to the central axis of said annular centering ring.

8. A tire loading apparatus according to claim 7, wherein said centering means comprises a plurality of bead holders movably mounted to said holding stand for radial movement, each bead holder having a green tire bead engaging portion for engaging an upper bead of a green tire held by said holding ring in such a way so that said annular centering ring can also engage the upper bead of the green tire held in said holding ring.

9. A tire loading apparatus according to claim 8, wherein said centering ring and said plurality of bead holders are shaped to engage each other with said centering ring and said bead holders also engaged with the upper bead of a green tire supported by said holding ring.

10. A tire loading apparatus according to claim 1, wherein said support is positioned above a center of an annular bead of a green tire to be loaded, a plurality of shoe guides extending radially outwardly from said support, said plurality of clamping shoes slidably mounted respectively to said plurality of shoe guides, each end of each of said plurality of clamping shoes extending downwardly from each shoe guide respectively and curved outwardly with respect to said support, a holding member connected to said support and having a radially outwardly extending arm connected to said annular centering ring.

11. A tire loading apparatus according to claim 10, including a pin extending into a radial outer portion of said radial arm and into said centering ring, and further biasing means engaged between said pin and said radial arm for establishing a resilient connection between said centering ring and said holding member.

12. A tire loading apparatus according to claim 11, wherein said holding member is mounted for axial upward movement to said support and a spring engaged between said support and said holding member for biasing said holding member downwardly.

* * * * *